(12) United States Patent
Byun et al.

(10) Patent No.: US 7,601,457 B2
(45) Date of Patent: Oct. 13, 2009

(54) BATTERY MODULE

(75) Inventors: Sang-Won Byun, Yongin-si (KR);
Tae-Yong Kim, Yongin-si (KR);
Yoon-Cheol Jeon, Yongin-si (KR);
Gun-Goo Lee, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

(21) Appl. No.: 11/852,143

(22) Filed: Sep. 7, 2007

(65) Prior Publication Data

US 2008/0063929 A1    Mar. 13, 2008

(30) Foreign Application Priority Data

Sep. 11, 2006    (KR) .................. 10-2006-0087365

(51) Int. Cl.
*H01M 2/20* (2006.01)
*H01M 2/24* (2006.01)
*H01M 2/00* (2006.01)

(52) U.S. Cl. ............... 429/121; 429/158; 429/159; 429/160; 429/163; 429/170; 429/178; 429/179

(58) Field of Classification Search ............ 429/121, 429/158, 159, 160, 163, 170, 178, 179
See application file for complete search history.

(56) References Cited

U.S. PATENT DOCUMENTS 4,117,969 A * 10/1978 Fukuba .............. 228/140
5,154,646 A    10/1992 Shoup
6,423,441 B1 *  7/2002 Ronning et al. ......... 429/82

FOREIGN PATENT DOCUMENTS

| DE | 101 01 050 A1 | 7/2001 |
|---|---|---|
| JP | 63-19757 | 1/1988 |
| JP | 2003-249207 | * 9/2003 |
| JP | 2005-317323 | 11/2003 |
| KR | 10-2006-0018326 | 3/2006 |

OTHER PUBLICATIONS

European Search Report, dated Nov. 7, 2007, for European Application No. 07116039.4, indicating relevance of cited references in this IDS.
Patent Abstracts of Japan; Publication No. 63-019757, dated Jan. 27, 1988, in the name of Kazusumi Takeuchi et al.
Korean Patent Abstracts; Publication No. 1020060018326 A, dated Mar. 2, 2006, in the name of Tae Yong Kim.
English Abstract corresponding to German Publication DE 101 01 050 A1, dated Jul. 26, 2001 listed above.

* cited by examiner

*Primary Examiner*—Patrick Ryan
*Assistant Examiner*—Angela J. Martin
(74) *Attorney, Agent, or Firm*—Christie, Parker & Hale, LLP (57) ABSTRACT

A battery module includes a plurality of unit batteries, each unit battery having a terminal having a terminal contact portion. A electrically conductive adaptor connects the terminals of adjacent unit batteries, the electrically conductive adaptor having an adaptor contact surface. The terminal contact portion has a contact portion contact surface coupled to the adaptor contact surface. The contact portion contact surface and the adaptor contact surface are parallel to a longitudinal axis of the terminal.

15 Claims, 9 Drawing Sheets

BATTERY MODULE

CROSS-REFERENCE TO RELATED APPLICATION

This application claims priority to and the benefit of Korean Patent Application No. 10-2006-0087365 filed on Sep. 11, 2006, in the Korean Intellectual Property Office, the entire content of which is incorporated herein by reference.

BACKGROUND OF THE INVENTION

1. Field of the Invention

The present invention relates to a battery module, and more specifically to a terminal coupling structure of a battery module.

2. Description of the Related Art

Unlike a primary battery, a secondary battery is rechargeable. Small capacity batteries each having a single unit cell are generally used for various portable electronic devices such as phones, laptop computers, and camcorders. Large capacity batteries each having a plurality of unit cells are generally used as the power source for driving motors, such as those in hybrid electric vehicles.

Secondary batteries may be classified into different types, for example, prismatic and cylindrical batteries, depending on their shape. Single secondary batteries (hereinafter "unit batteries") are often connected serially to form a large capacity secondary battery (hereinafter "battery module").

Each of the unit batteries typically includes an electrode assembly having a positive electrode, a negative electrode and a separator between the positive and negative electrodes, a case for housing the electrode assembly and a cap assembly to seal the case. Positive and negative terminals extend to the exterior of the case through the cap assembly and may be connected to the positive and negative electrodes, respectively.

The unit batteries are often arranged such that positive and negative terminals of one unit battery alternate with the positive and negative terminals of an adjacent unit battery. The positive terminal of one unit battery is electrically connected to the negative terminal of the adjacent unit battery by an electrically conductive adaptor to complete assembly of the battery module.

The electrically conductive adaptor are usually fixed on the positive and negative terminals by nuts. For example, the positive and negative terminals may be threaded. After the electrically conductive adaptor is inserted around the positive and negative terminals, the nuts are coupled to the threads to fix the electrically conductive adaptor to the positive and negative electrodes. Therefore, the positive and negative terminals of the adjacent unit batteries are electrically connected to each other.

However, in a conventional battery module, since a contact area between the terminal and the conductive connecting member is relatively small, the contact resistance may be high, resulting in deteriorated current collecting efficiency. Furthermore, in order to reduce the contact resistance between the terminal and the electrically conductive adaptor, sufficient coupling torque must be applied to the nut. However, when the coupling torque surpasses a threshold level, the coupling torque may rotate the terminal, causing the coupling to fail. Therefore, the amount of coupling torque is limited, and sufficient coupling torque may not be able to be applied to the nut.

SUMMARY OF THE INVENTION

A battery module is provided including a plurality of unit batteries, each unit battery having a terminal having a terminal contact portion. An electrically conductive adaptor connects the terminals of adjacent unit batteries, the electrically conductive adaptor having an adaptor contact surface. The terminal contact portion has a contact portion contact surface coupled to the adaptor contact surface. The contact portion contact surface and the adaptor contact surface are parallel to a longitudinal axis of the terminal.

The contact portion contact surface and the adaptor contact surface may be planar. The battery module may further include a second electrically conductive adaptor having a planar second adaptor contact surface. The terminal contact portion of the terminal further may include a planar second contact portion contact surface contacting the planar second adaptor contact surface. The terminal contact portion may be integral with the terminal. The electrically conductive adaptor may have a generally U-shaped cross-section. The unit battery may be prismatic.

In one exemplary embodiment, the terminal contact portion includes a slit parallel to a longitudinal axis of the terminal. The electrically conductive adaptor may be in the slit of the terminal contact portion. Additionally, the electrically conductive adaptor may be coupled to the terminal of the unit battery by a coupling member, the coupling member being perpendicular to a longitudinal axis of the terminal. The coupling member may be, for example, a nut and bolt, a rivet, or a weld.

The terminal contact portion may have a contact portion coupling hole for coupling the terminal contact portion to the first electrically conductive adaptor.

DETAILED DESCRIPTION

Figure 1:
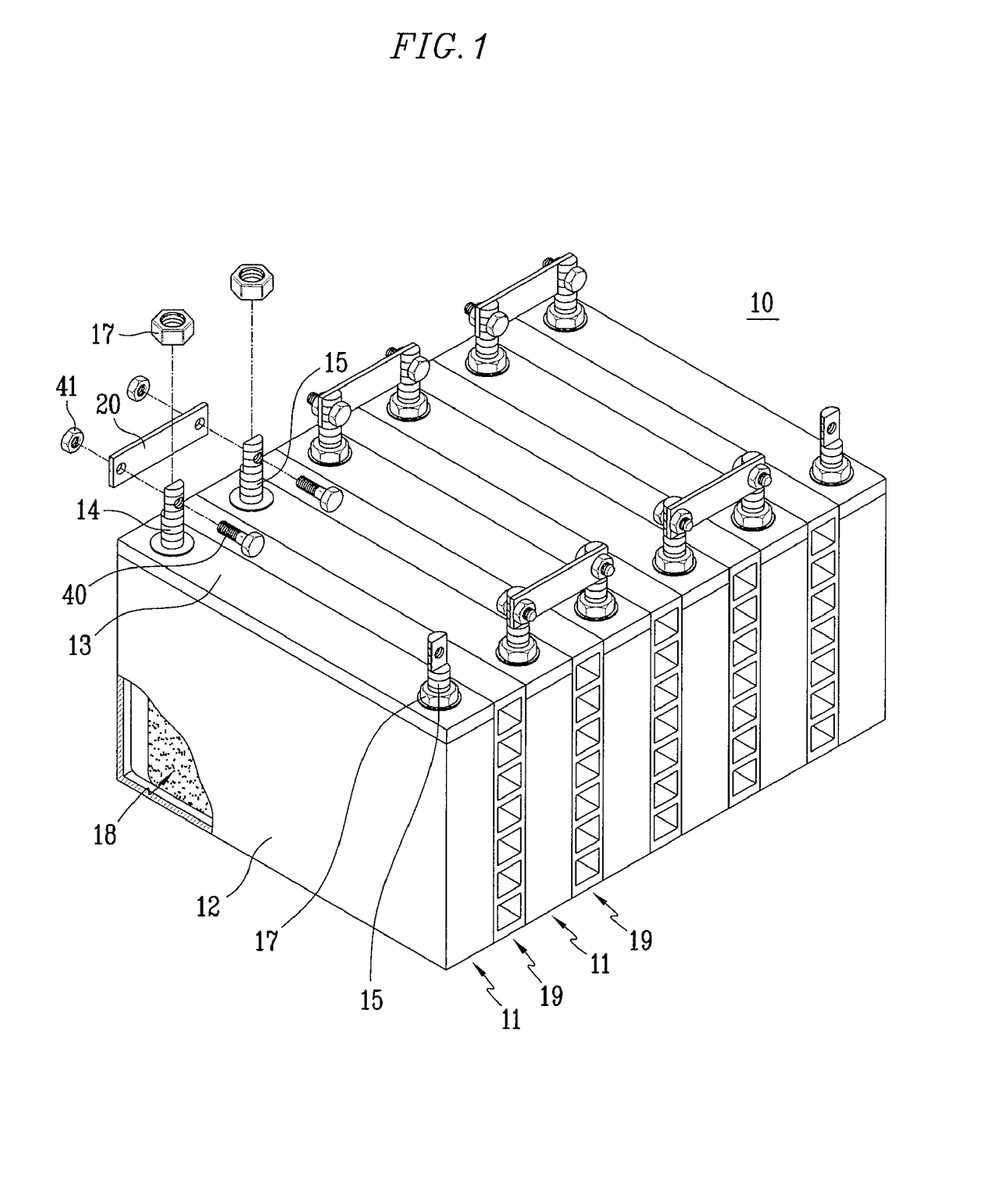
FIG. 1 is a partially exploded perspective view of a battery module according to an exemplary embodiment of the present invention.

With reference to FIG. 1, a battery module 10 includes a plurality of unit batteries 11 spaced from each other by a plurality of barriers 19 between the unit batteries 11. The barriers 19 provide channels along which a cooling medium for cooling the unit batteries may flow.

A prismatic unit battery will be used as an exemplary unit battery 11. Each unit battery 11 includes an electrode assembly 18 having a positive electrode, a negative electrode and a separator between the positive and negative electrodes, a case 12 for housing the electrode assembly 18, and a cap assembly 13 to seal the case 12. Positive and negative terminals 14, 15 protrude from the case 12 through the cap assembly 13 and are connected to the positive and negative electrodes, respectively.

The case 12 may comprise electrically conductive metal such as aluminum, an aluminum alloy, or steel-plated nickel. The case 12 may be a hexahedron shape or other shapes well known in the art.

Figure 2:
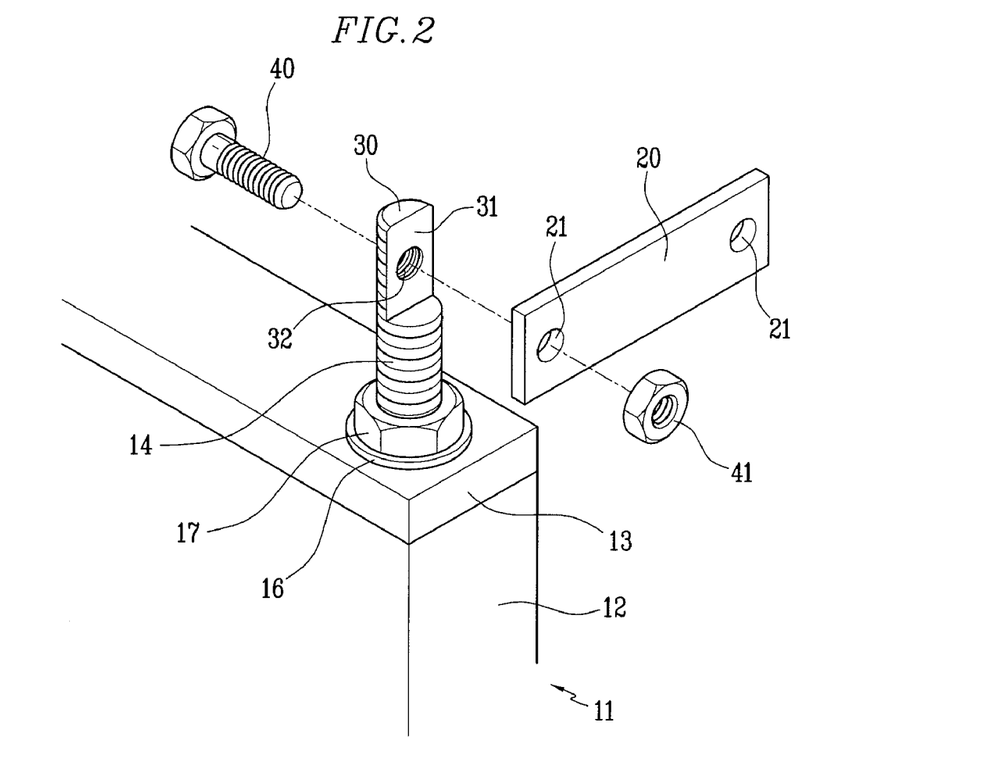
FIG. 2 is an partially exploded perspective view of a terminal connecting structure of the battery module of FIG. 1.

The positive and negative terminals 14, 15 protrude from the cap assembly 13, are spaced from each other, and may be threaded. In one exemplary embodiment, the positive and negative terminals 14, 15 are partially sectioned bolts. With reference also to FIG. 2, a gasket 16 may be between the cap assembly 13 and each positive and negative terminal 14, 15. Nuts 17 may be coupled to the positive and negative terminals 14, 15.

The unit batteries 11 may be arranged such that the positive and negative terminals 14, 15 of one unit battery alternate with the positive and negative terminals 14, 15 of an adjacent unit battery, thereby forming a module body. For example, the positive terminal 14 of one unit battery may be electrically connected to the negative terminal 15 of the adjacent unit battery by an electrically conductive adaptor 20. As such, the positive and negative terminals 14, 15 alternate along an exterior surface of the battery module body.

As shown in FIG. 2, a contact portion 30 extends along the terminal 14, 15 to couple the electrically conductive adaptor 20 to the terminal 14, 15. A side surface of the contact portion may define a planar contact surface 31. The contact portion 30 may have a coupling hole 32 adapted to receive a coupling member.

In one exemplary embodiment, the contact portion 30 has a semicircular cross-section. The contact portion 30 may have, for example, a planar contact surface 31 and a semicircular threaded surface. However, a shape of the contact portion 30 is not limited thereto.

In one exemplary embodiment, the electrically conductive adaptor 20 is a rectangular plate having coupling holes 21 proximal to each longitudinal end, each coupling hole alignable with a coupling hole 32 of the contact portion 30. The electrically conductive adaptor 20 may be sized to substantially cover the contact surface 31 of the contact portion 30.

Figure 3:
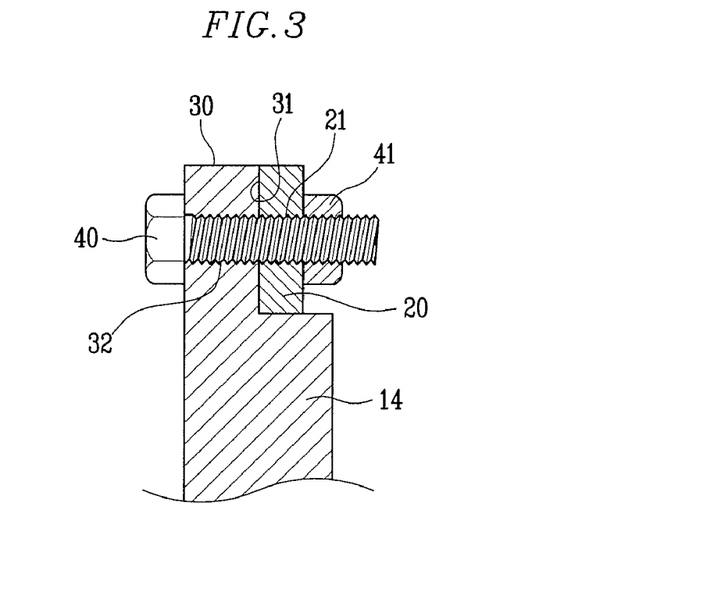
FIG. 3 is a sectional view of an assembled terminal connecting structure of FIG. 2.

As shown in FIG. 3, a coupling hole 21 of the electrically conductive adaptor 20 is aligned with a coupling hole 32 of the contact portion 31 and attached to the contact portion by a coupling member to be electrically connected to a terminal 14 or 15. For example, a coupling bolt 40 and a coupling nut 41 may be used to press the electrically conductive adaptor 20 and the contact portion 31 against each other.

As described above, since the electrically conductive adaptor 20 substantially covers the contact surface 31, the contact area between the electrically conductive adaptor 20 and the terminal 14, 15 is sufficient, thereby providing an improved current collecting efficiency. In addition, since the coupling bolt 40 is perpendicular to a longitudinal axis of the terminal 14, 15, the coupling torque of the coupling bolt 40 does not significantly rotate the terminal 14, 15. Accordingly, the coupling torque applied to the coupling bolt 40 can be increased without affecting fixation of either terminal 14, 15. As a result of the sufficient tension, the contact resistance between the contact surface 31 and the electrically conductive adaptor 20 can be reduced.

Although a coupling bolt 40 and the coupling nut 41 are described as an exemplary coupling member, the present invention is not limited thereto. Rather, other coupling members, for example, screws, rivets, pins, welds, and adhesive, may be used as coupling members.

Figure 4:
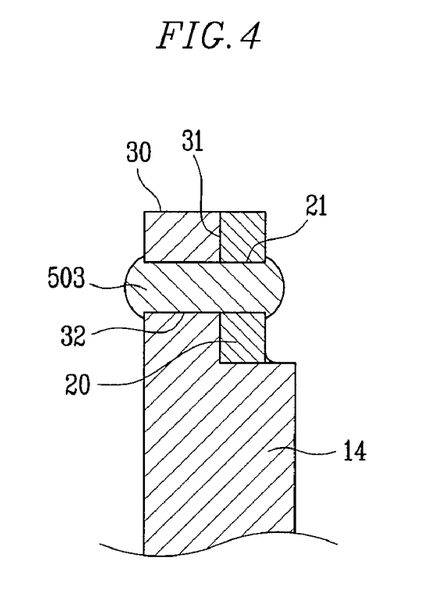
FIG. 4 is a sectional view of a terminal connecting structure according to another exemplary embodiment of the present invention.

FIG. 4 shows a connecting structure of the terminal and the electrically conductive adaptor according to another exemplary embodiment of the present invention. In this embodiment, a rivet 503 is used as the coupling member. In this case, the rivet 503 is inserted through the coupling holes 32, 21 of the contact portion 30 and electrically conductive adaptor 20, respectively, to electrically connect the contact portion 30 and the electrically conductive adaptor 20.

Figure 5:
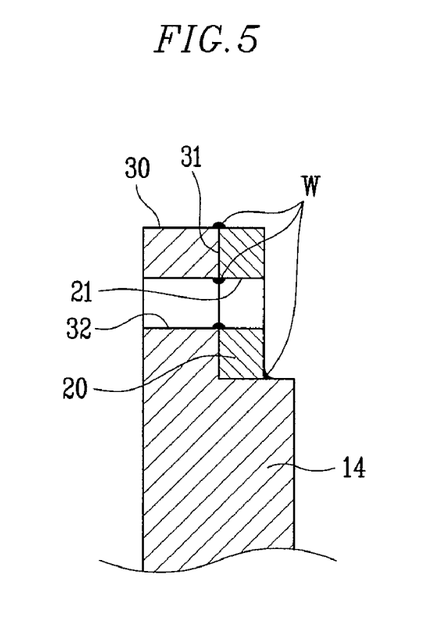
FIG. 5 is a schematic sectional view of a terminal connecting structure according to still another exemplary embodiment of the present invention.

FIG. 5 shows a connecting structure of the terminal and the electrically conductive adaptor according to still another exemplary embodiment of the present invention. In this embodiment, the contact portion 30 and the electrically conductive adaptor 20 are attached by welding. The "W" in FIG. 5 indicates a weld between the contact portion 30 and the electrically conductive adaptor 20.

Figure 6:
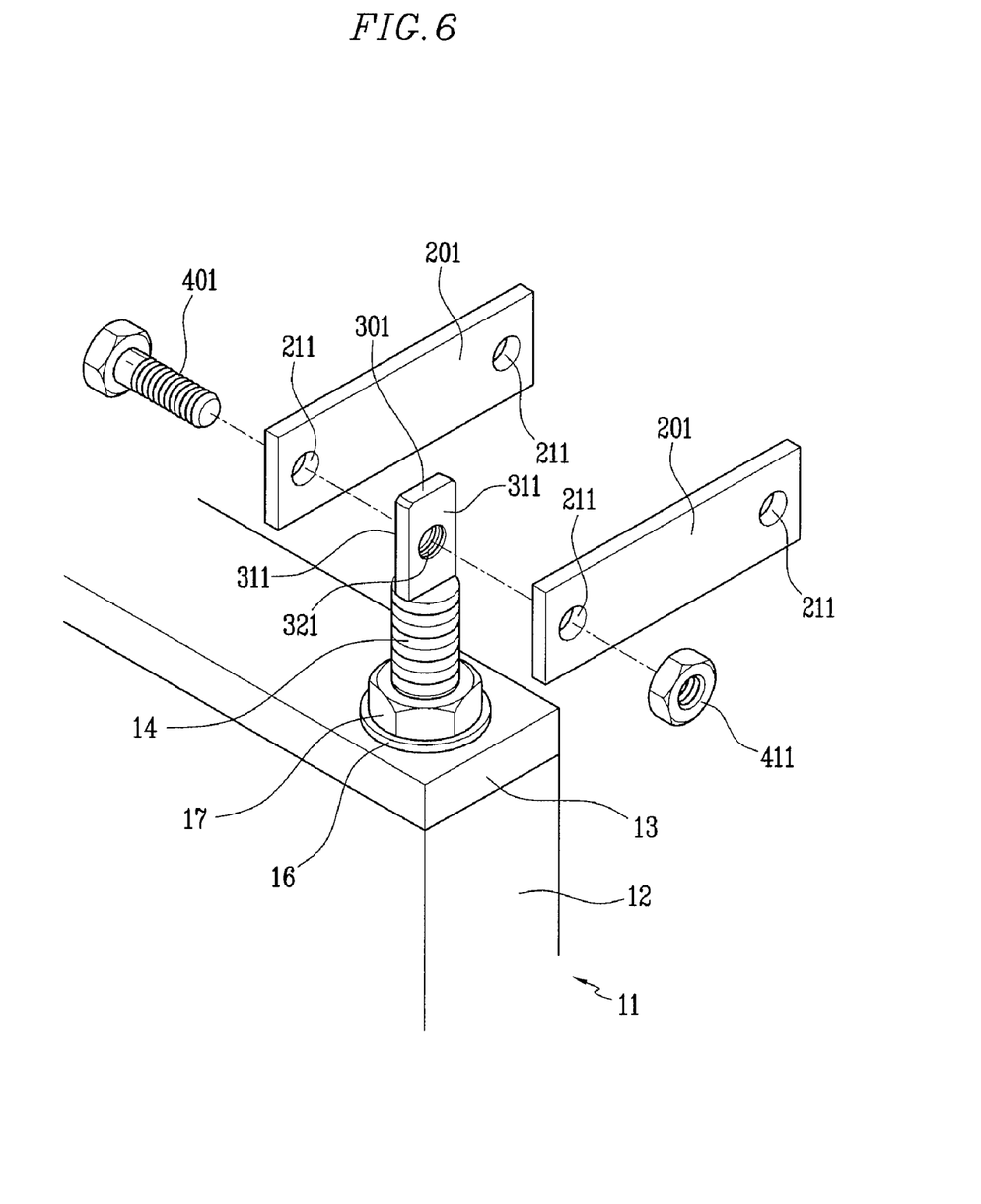
FIG. 6 is a partially exploded perspective view of a terminal connecting structure according to yet another exemplary embodiment of the present invention.
Figure 7:
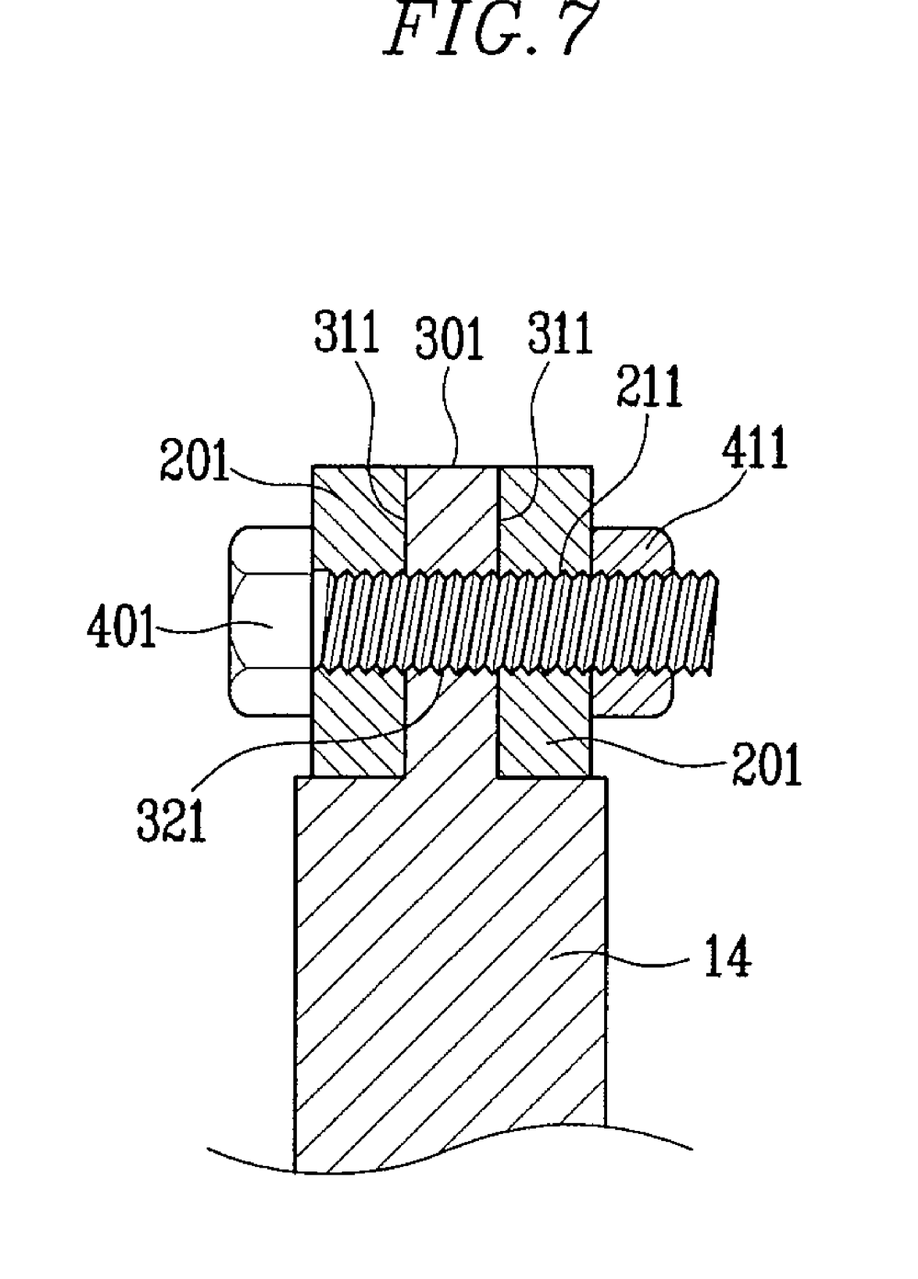
FIG. 7 is a sectional view of an assembled terminal connecting structure of FIG. 6.

FIGS. 6 and 7 show a connecting structure of the terminal and the electrically conductive adaptor according to still yet another exemplary embodiment of the present invention. In this embodiment, a contact portion 301 extends along a centerline of the terminal 14, 15 along a longitudinal axis, the contact portion having opposite planar contact surfaces 311. The contact portion 301 has a coupling hole 321 perpendicular to the opposite contact surfaces 311.

A pair of electrically conductive adaptors 201 for connecting the terminals 14, 15 of the adjacent unit batteries 11 each contact an opposite contact surface 311 of the terminal 14, 15. Similar to the electrically conductive adaptors described above, the electrically conductive adaptor 201 is a rectangular plate having coupling holes 211 alignable with a coupling hole 321 of the contact portion 301. The electrically conductive adaptor 201 may be sized to significantly contact the contact surface 311 of the contact portion 301.

Also similarly to previously described embodiments, a coupling bolt 401 and a coupling nut 411 may be used to electrically couple the electrically conductive adaptor 201 to the contact portion 301. In one exemplary embodiment, once the coupling hole 211 is aligned with the coupling hole 321 of the contact portion 301, the coupling bolt 401 is inserted through the holes and fixed with the coupling nut 411.

Since the electrically conductive adaptors 201 contact both opposite contact surfaces 311 of the contact portion 301, the contact area between the terminal 14, 15 and the electrically conductive adaptors 201 is twice as large as when only a single electrically conductive adaptor is used. Accordingly, the current collecting efficiency can be further improved.

Figure 8:
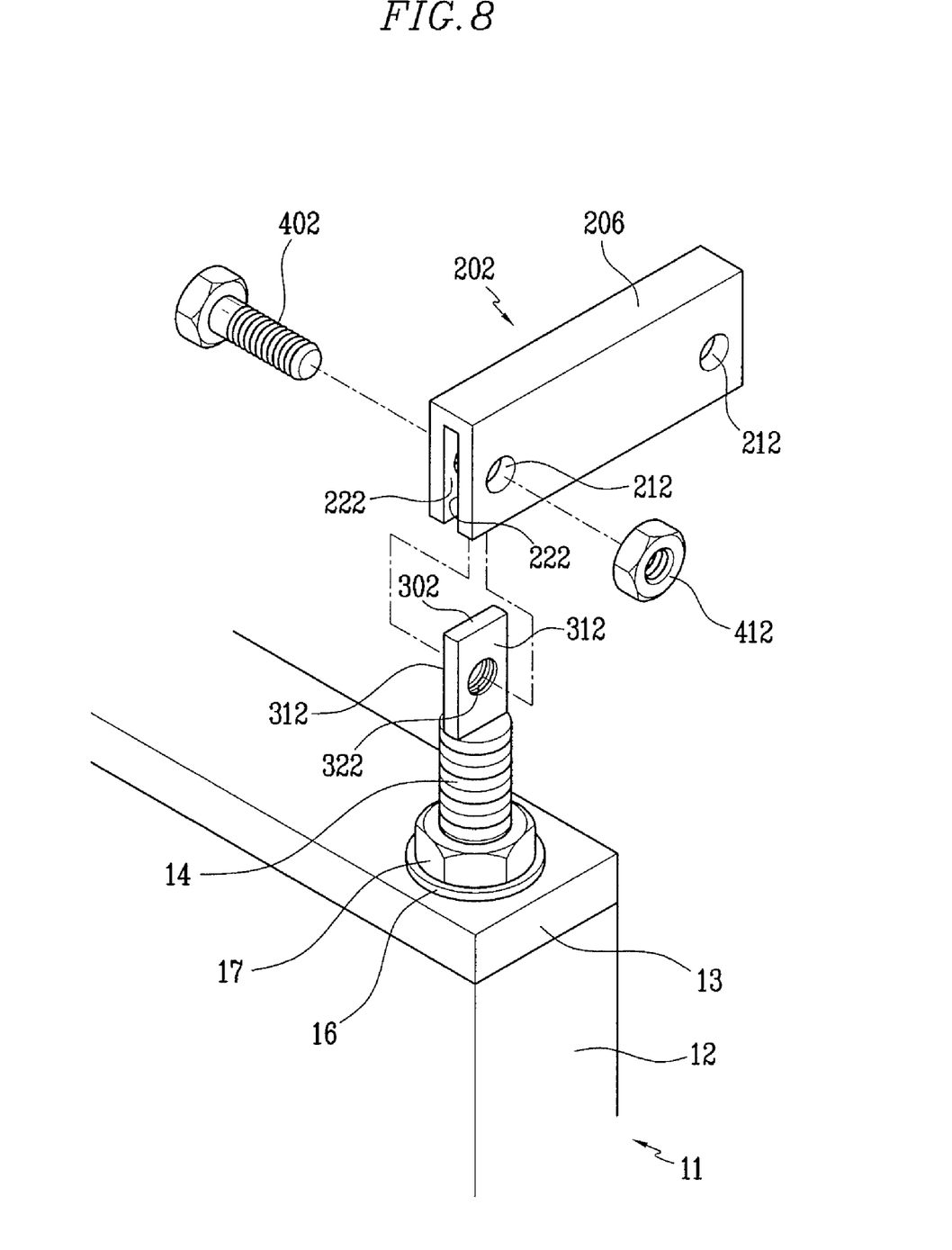
FIG. 8 is a partially exploded perspective view of a terminal connecting structure according to still yet another exemplary embodiment of the present invention.
Figure 9:
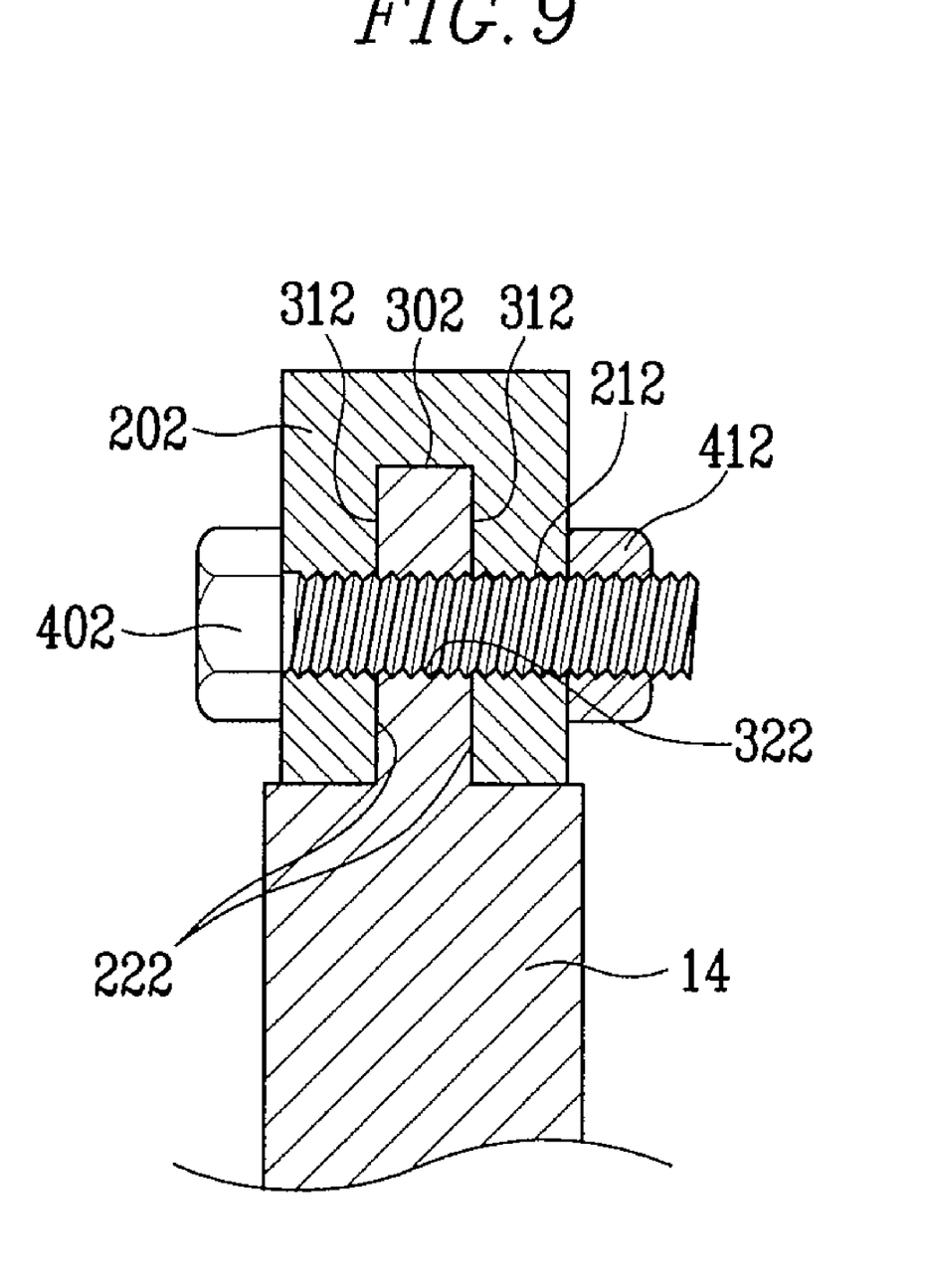
FIG. 9 is a partially exploded sectional view of an assembled terminal connecting structure of FIG. 8.

FIGS. 8 and 9 show a connecting structure of the terminal and the electrically conductive adaptor according to still yet another exemplary embodiment of the present invention. Referring to FIGS. 8 and 9, a contact portion 302 extends along a longitudinal centerline of the terminal 14, 15 having opposite planar contact surfaces 312. The contact portion 302 has coupling holes 322 perpendicular to the opposite planar contact surfaces 312.

An electrically conductive adaptor 202 is generally U-shaped having two rectangular plates 222 spaced by a base 206. In one exemplary embodiment, the space may correspond to a thickness of the contact portion 302. Each rectangular plate 222 may have coupling holes 212 alignable with the coupling hole 322 of the contact portion 301.

As shown in FIG. 9, when the electrically conductive adaptor 202 is fitted into the space between the rectangular plates 222 of the electrically conductive adaptor 202 such that the opposite contact surfaces 312 of the contact portion 302 contact each plate. After the coupling holes 212 of the electrically conductive adaptor 202 are aligned with the coupling hole 322 of the contact portion 302, the electrically conductive adaptor 202 is pressed toward the opposite contact surfaces 312 using, for example, a coupling bolt 402 and a coupling nut 412. As a result, the terminal 14, 15 is electrically connected to the electrically conductive adaptor 202.

Since the single electrically conductive adaptor 202 contacts both opposite contact surfaces 312 of the contact portion 302, the current collecting efficiency can be improved. Additionally, installation of a single U-shaped electrically conductive adaptor 202 may be simpler than installing two electrically conductive adaptors.

Figure 10:
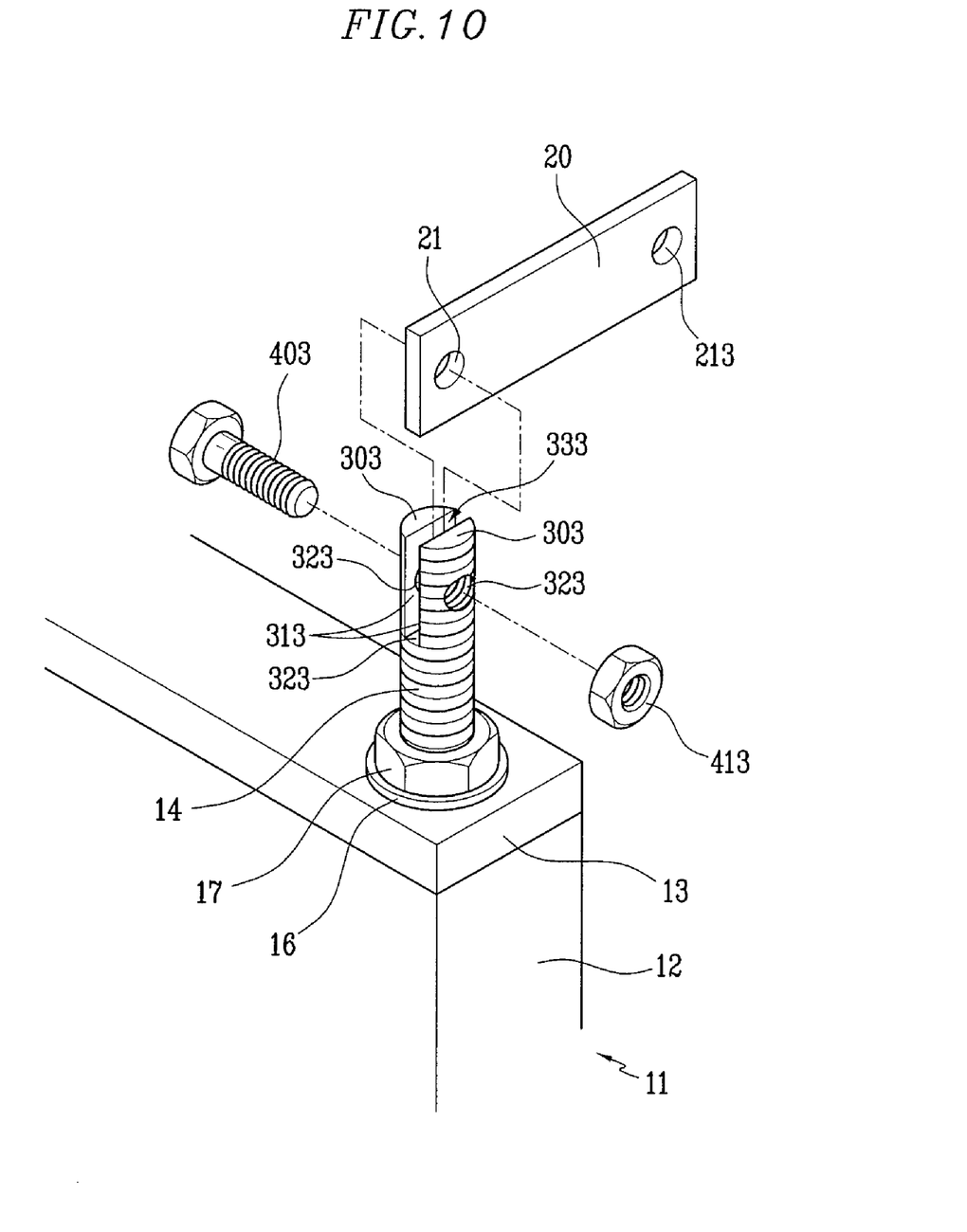
FIG. 10 is an exploded perspective view of a terminal connecting structure according to yet another exemplary embodiment of the present invention.
Figure 11:
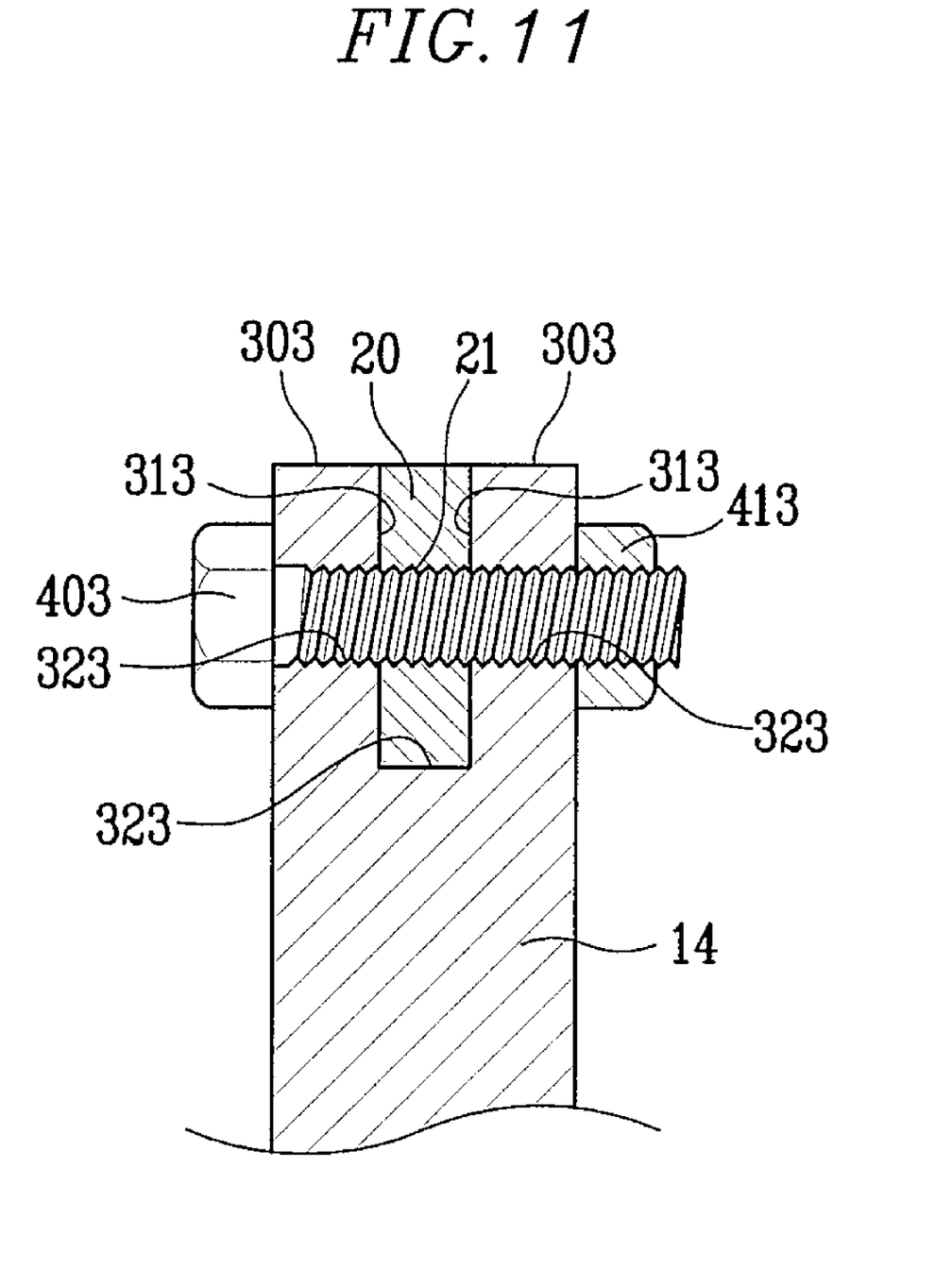
FIG. 11 is a sectional view of an assembled terminal connecting structure of FIG. 10.

FIGS. 10 and 11 show a connecting structure of the terminal and the electrically conductive adaptor according to still yet another exemplary embodiment of the present invention. Referring to FIGS. 10 and 11, a contact portion 303 extends along a longitudinal axis of the terminal 14. A slit 333 is defined in the terminal 14 by facing inner planar contact surfaces 313. The contact portion 303 has coupling holes 323 perpendicular to the facing contact surfaces 313.

As shown in FIG. 11, when the electrically conductive adaptor 20 is inserted into the slit 333 of the contact portion 303 such that the coupling hole 21 is aligned with the coupling holes 323 of the contact portion 303, the inner facing contact surfaces 313 of the contact portion 303 electrically contact the electrically conductive adaptor 203. The contact portion 303 may be secured to the electrically conductive adaptor 203 using, for example, a coupling bolt 403 and a coupling nut 413.

According to the present invention, since the contact area between the electrically conductive adaptor and the terminal is significant, the electric conductivity can be improved. In addition, the coupling defectiveness due to applied torque may be reduced. Furthermore, since the coupling force between the electrically conductive adaptor and the terminal is sufficient, the contact resistance may be reduced.

Although exemplary embodiments of the present invention have been shown and described, it will be appreciated by those skilled in the art that changes may be made in this embodiment without departing from the principles and spirit of the invention, the scope of which is defined in the claims and their equivalents.

What is claimed is:

1. A battery module comprising:
a plurality of unit batteries, each of the plurality of unit batteries comprising a generally cylindrical terminal having a longitudinal axis extending in a first direction and having a terminal contact portion with a first planar contact surface substantially parallel to the first direction; and
an electrically conductive adaptor connecting the generally cylindrical terminal of a first unit battery of the plurality of unit batteries and the generally cylindrical terminal of a second unit battery of the plurality of unit batteries, the electrically conductive adaptor having a second planar contact surface;
wherein the first planar contact surface directly contacts and is coupled to the second planar contact surface.

2. The battery module of claim 1, further comprising a second electrically conductive adaptor having a third planar contact surface;
wherein the terminal contact portion has a fourth planar contact surface directly contacting the third planar contact surface.

3. The battery module of claim 1, wherein the terminal contact portion is integral with the generally cylindrical terminal.

4. The battery module of claim 1, wherein the terminal contact portion comprises a slit for receiving the second planar contact surface.

5. The battery module of claim 4, wherein the electrically conductive adaptor is within the slit.

6. The battery module of claim 1, wherein the terminal contact portion has a fifth planar contact surface; and
wherein the electrically conductive adaptor has a generally U-shaped cross-section having two legs, one of the two legs in direct contact with the first planar contact surface and another in direct contact with the fifth planar contact surface.

7. The battery module of claim 1, wherein the electrically conductive adaptor is coupled to the generally cylindrical terminal by a coupling member; and
wherein the coupling member is generally perpendicular to the first planar contact surface.

8. The battery module of claim 7, wherein the terminal contact portion has a first coupling hole for coupling the terminal contact portion to the electrically conductive adaptor.

9. The battery module of claim 8, wherein the electrically conductive adaptor has a second coupling hole aligned with the first coupling hole.

10. The battery module of claim 9, wherein the coupling member comprises a bolt for penetrating the first coupling hole and the second coupling hole, and a nut couplable to the bolt.

11. The battery module of claim 9, wherein the coupling member comprises a rivet.

12. The battery module of claim 1, wherein the electrically conductive adaptor is fixed to the terminal contact portion by welding.

13. The battery module of claim 1, further comprising a barrier between each of the plurality of unit batteries.

14. The battery module of claim 1, wherein each of the plurality of unit batteries is prismatic.

15. A battery module comprising:
a plurality of unit batteries, each of the plurality of unit batteries comprising a generally cylindrical terminal having a longitudinal axis extending in a first direction and having a terminal contact portion; and
an electrically conductive adapter connecting the generally cylindrical terminal of a first unit battery of the plurality of unit batteries and the generally cylindrical terminal of a second unit battery of the plurality of unit batteries, the electrically conductive adaptor having a first planar contact surface;
wherein the terminal contact portion has a slit for receiving the first planar adaptor contact surface; and
wherein the first planar contact surface directly contacts and is coupled to the slit such that the first planar contact surface is substantially parallel to the first direction.

* * * * *